United States Patent [19]

Ohmae et al.

[11] Patent Number: 5,430,081
[45] Date of Patent: Jul. 4, 1995

[54] FIRE RETARDANT ADDITIVE AND FIRE RETARDANT THERMOPLASTIC RESIN COMPOSITION

[75] Inventors: Tadayuki Ohmae, Toyonaka; Yoshikatsu Ogawa, Takatsuki; Haruhiko Hisada, Yao; Masahide Yoshiya, Osaka; Noboru Yamaguchi, Ichihara; Sumio Hara; Tohru Fujiki, both of Sodegaura, all of Japan

[73] Assignees: Sumitomo Chemical Company, Ltd.; Marubishi Oil Chemical Co., Ltd., both of Osaka, Japan

[21] Appl. No.: 340,295

[22] Filed: Nov. 14, 1994

[30] Foreign Application Priority Data

Nov. 16, 1993 [JP] Japan .................. 5-286609

[51] Int. Cl.⁶ .......................... C08K 3/38; C08K 3/32
[52] U.S. Cl. .......................... 524/100; 524/405; 524/416; 524/436; 524/437; 525/69
[58] Field of Search ............... 524/436, 437, 100, 416, 524/405; 525/69

[56] References Cited

U.S. PATENT DOCUMENTS

| Re. 28,212 | 10/1974 | Grosjean | 525/69 |
|---|---|---|---|
| 3,269,963 | 8/1966 | Ilgemann et al. | 324/17 |
| 3,872,182 | 3/1975 | Sextro et al. | 525/69 |
| 4,193,945 | 3/1980 | Bertelli et al. | |
| 4,216,138 | 8/1980 | Bost et al. | 524/100 |
| 4,504,610 | 3/1985 | Fortanelli et al. | |
| 4,719,045 | 1/1988 | Ogawa et al. | |
| 4,778,849 | 10/1988 | Bartman et al. | 525/69 |
| 4,853,424 | 8/1989 | Staendeke et al. | 524/416 |
| 4,956,421 | 9/1990 | Denzinger et al. | 525/385 |
| 4,966,931 | 10/1990 | Akitaya et al. | |
| 5,302,642 | 4/1994 | Cipolli et al. | 524/416 |

FOREIGN PATENT DOCUMENTS 2142638 1/1985 United Kingdom .

*Primary Examiner*—Veronica P. Hoke
*Attorney, Agent, or Firm*—Sughrue, Mion, Zinn, Macpeak & Seas

[57] ABSTRACT

A flame retardant thermoplastic resin composition which comprises (A) 50 to 90% by weight of a thermoplastic resin which is the base polymer and 50 to 10% by weight of a total of (B) a nitrogen-containing condensed phosphoric acid compound, (C) a comb-like polymer consisting of a polyethylene main chain and a polyoxyalkylene side chain and (D) a metal-containing compound having a carbonization accelerating effect, the amounts of the components (B), (C) and (D) being 5 to 49% by weight, 1 to 15% by weight and 0 to 10% by weight, respectively, in which the total amount of the components (A), (B), (C) and (D) is 100% by weight; a process for producing the composition; a flame-retardant consisting of the components (B), (C) and (D); and a process for producing the flame-retardant.

20 Claims, No Drawings

FIRE RETARDANT ADDITIVE AND FIRE RETARDANT THERMOPLASTIC RESIN COMPOSITION

BACKGROUND OF THE INVENTION

1. Field of the Invention

This invention relates to a flame-retardant and a flame retardant thermoplastic resin composition. In particular, it relates to a flame-retardant and a flame retardant thermoplastic resin composition which are free from such a toxicity problem due to a halogen gas generated during combustion or molding as in the use of a halogen-containing flame-retardant, are small in such influence on the molding processing characteristics and mechanical properties of a resin as in the use of an inorganic flame-retardant and have long term antistatic properties.

2. Description of the Related Art

Thermoplastic resins have been used in large amounts in a wide field such as automobile parts, parts for domestic appliances, parts for business, industrial parts, miscellaneous goods and the like; however, in some uses, it has been required to make the resin materials to be used incombustible or flame retardant from the viewpoint of the controlling or minimizing of disasters and the protecting of human life and the like when unexpected ignition or combustion is caused.

The most general method for making a thermoplastic resin flame retardant is to incorporate a flame-retardant into the resin, and is the flame-retardant, there have been used an inorganic flame-retardant, a representative of which is magnesium hydroxide and aluminum hydroxide, and a halogen-containing flame-retardant, a representative of which is decabromodiphenyl oxide.

Many other flame-retardants have also been known, and examples thereof are mentioned in., for example, Fine Chemical, Vol. 20, No. 11 (1991), pp. 9–36.

However, when an inorganic flame-retardant is used, this must be incorporated into a thermoplastic resin, which is the objective base polymer, in an at least equal amount in order to obtain the desired level of flame retarding effect, and this fact adversely affects the light weight, mechanical strength and cheapness, which are the characteristics of the resin, and causes such a problem as reduction of flow properties in molding.

The halogen-containing flame-retardant is characterized in that even when it is used in an amount smaller than that of the inorganic flame-retardant the desired level of flame retarding effect is obtained and hence its effect on the mechanical strength of the resin is relatively small; however, there have been pointed out such a problem that when the compounded resin is exposed to strong heat in combustion or molding, harmful and toxic fumes are liberated and such a fear that the molding machine may be corroded.

On the other hand, a rapid development of a non-halogen type flame-retardant by which such a problem is less caused has recently been made and, for example, Japanese Patent Application Kokai No. 61-106,643 discloses a flame-retardant for polyolefin comprising as an effective component a nitrogen-containing condensed phosphoric acid compound consisting of a condensed phosphoric acid compound such as ammonium carbamyl polyphosphate and a triazine compound such as melamine powder.

In Japanese Patent Application Kokoku No. 60-35,947, Japanese Patent Application Kokai No. 59-147,050, Japanese Patent Application Kokai No. 1-193,347 and the like, a system consisting of an ammonium polyphosphate and a 1,3,5-triazine derivative is disclosed as a flame-retardant for thermoplastic resins.

Moreover, Japanese Patent Application Kokai No. 60-36,542 discloses a fire retardant additive composition consisting of an ammonium polyphosphate and a polyhydroxy low molecular weight compound such as pentaerythritol.

Such prior art flame-retardants are considered to be excellent in that flame retardancy in the desired level is obtained by adding them in a relatively small amount and that they are safe; however, they are unsatisfactory in that flame retardancy is unsatisfactory when they are added in a smaller amount and in that when resins are made flame retardant thereby physical properties are deteriorated and molding processing characteristics and surface appearance of molded article obtained therefrom are also deteriorated.

SUMMARY OF THE INVENTION

This invention aims at providing a flame-retardant and a flame retardant thermoplastic resin composition which are free from halogen and have excellent flame retardancy, good resin properties and excellent molding processing characteristics.

According to this invention, there is provided a flame retardant thermoplastic resin composition which comprises (A) a thermoplastic resin which is the base polymer, (B) a nitrogen-containing condensed phosphoric acid compound, (C) a comb-like polymer consisting of a polyethylene main chain and a polyoxyalkylene side chain and (D) a metal-containing compound having a carbonization accelerating effect, the amount of the component (A) being 50 to 90% by weight of the composition and the amounts of the components (B), (C) and (D) being 5 to 49% by weight, 1 to 15% by weight and 0 to 10% by weight, respectively, in which the total amount of the components (A), (B), (C) and (D) is 100% by weight.

This invention also provides a flame-retardant which comprises (B) 10 to 98% by weight of a nitrogen-containing condensed phosphoric acid compound, (C) 2 to 30% by weight of a comb-like polymer consisting of a polyethylene main chain and a polyoxyalkylene side chain and (D) 0 to 20% by weight of a metal-containing compound having a carbonization accelerating effect.

DETAILED DESCRIPTION OF THE INVENTION

The thermoplastic resin (A) which is the base polymer in this invention includes olefin polymers.

The olefin polymers include, for example, homopolymers and copolymers of olefins such as ethylene, propylene, butene-1, pentene-1, hexene-1, heptene-1, octene-1 and the like, and specific examples thereof include polyethylene, polypropylene, ethylene-propylene copolymer, ethylene-butene-1 copolymer, ethylene-hexene-1 copolymer and ethylene-octene-1 copolymer.

Said olefin polymers also include copolymers of said olefin with polar monomers comprising the olefin unit as the main constituent, specifically ethylene-vinyl acetate copolymer, ethylene-methylmethacrylate copolymer, ethylene-acrylic acid copolymer, ethylene-vinyl alcohol copolymer and the like.

These olefin polymers may be used alone or in combination of two or more.

The thermoplastic resin (A) which is the base polymer in this invention includes homopolymers and copolymers of unsaturated carboxylic acids and their alkyl esters such as acrylic acid, methacrylic acid, methylacrylate, methylmethacrylate and the like and vinyl esters of saturated carboxylic acids such as vinyl acetate, vinyl butyrate and the like.

These homopolymers and copolymers may be used alone or in combination of two or more.

The thermoplastic resin (A) which is the base polymer in this invention includes also vinyl aromatic polymers.

Said vinyl aromatic polymers include, for example, homopolymers and copolymers of styrenic monomers such as styrene, α-methylstyrene and vinyl toluene, and specific examples thereof include polystyrene, poly-α-methylstyrene, polyvinyltoluene, styrene-α-methylstyrene copolymer, styrene-vinyltoluene copolymer and the like.

The vinyl aromatic polymers further include, for example, copolymers of styrene with acrylonitrile monomer, maleimide monomer, acrylic acid ester monomer, maleic acid monomer, and specific examples thereof include styrene-acrylonitrile copolymer, styrene-butadiene-acrylonitrile copolymer, styrene-methylacrylate copolymer, styrene-maleic anhydride copolymer and the like.

Said vinyl aromatic polymers may also be modified with a rubbery polymer, and the rubbery polymer includes, for example, polybutadiene, styrene-butadiene copolymer, butadiene-acrylonitrile copolymer, ethylene-propylene-diene copolymer, butadiene-acrylic acid ester copolymer and the like.

These vinyl aromatic polymers may be used alone or in combination of two or more.

Furthermore, the thermoplastic resin (A) which is the base polymer in this invention includes also engineering plastics such as polyphenylene ether, rubber-modified polyphenylene ether, polyethylene terephthalate, polybutylene terephthalate, polyamide, polycarbonate, polyacetal, polysulfone, polyethersulfone, polyphenylene sulfide, polyarylate, polyamide-imide, polyetheramide, polyetherketone, polyetheretherketone, polyimide and the like.

The thermoplastic resins (A) in this invention may also be chemically modified products, blends and alloyed products of the above-mentioned thermoplastic resins or may be reinforced with glass fiber or the like.

As the thermoplastic resin (A) to be used in this invention, among the above-mentioned examples, particularly preferable in industry are those consisting of one or more olefin polymers mentioned above or those consisting of one or more vinyl aromatic polymers in view of the moldability and mechanical properties of a flame retardant resin composition prepared by mixing the thermoplastic resin (A) with (B) a nitrogen-containing condensed phosphoric acid compound, (C) a comb-like polymer consisting of a polyethylene main chain and a polyoxyalkylene side chain and (D) a metal-containing compound having a carbonization accelerating effect.

When halogen-containing resins, for example, polyvinyl chloride, polyvinylidene chloride, chlorinated polyethylene, chlorosulfonated polyethylene and the like, are used as the base polymer of this invention, the flame retardancy can be improved, but the halogen-containing resins become a source of generating a toxic gas due to the halogen element contained therein when the resins are burned, and hence, are not the optimum resins to be used in this invention.

The nitrogen-containing condensed phosphoric acid compounds (B) used in this invention are water-sparingly soluble or -insoluble compounds having a nitrogen/phosphorus weight ratio of 0.1-8.0, preferably 0.2-4.0 prepared by heating, at 100°-400° C., preferably 200°-350° C., a phosphoric acid component such as phosphoric acid, pyrophosphoric acid, polyphosphoric acid, phosphoric anhydride or the like and a nitrogen compound such as urea, melamine, dicyandiamide, biuret, cyanuric acid, isocyanuric acid, ammonia, ammonium carbonate, ammonium hydrogencarbonate, guanidine carbonate or the like; a product obtained by heating the above nitrogen compound; or the like.

The nitrogen-containing condensed phosphoric acid compound includes, for example, ammonium polyphosphate, polyphosphoric amide, ammonium polyphosphoric acid amide, melamine polyphosphate acid, melamine-modified ammonium polyphosphate, melamine-modified polyphosphoric acid amide, melamine-modified ammonium polyphosphoric acid amide, melamine-modified carbamyl polyphosphate, carbamyl polyphosphate, phosphoric acid-urea-dicyanamide-melamine reaction product, phosphoric anhydride-urea-melamine-ammonium bicarbonate reaction product, and phosphoric anhydride-urea-melamine-ammonium bicarbonate-dicyanamide reaction product, and these may be used alone or in combination of two or more.

The nitrogen-containing condensed phosphoric acid compound is preferably at least one compound selected from the group consisting of ammonium polyphosphate, polyphosphoric acid amide, melamine-modified ammonium polyphosphate, carbamyl polyphosphate and phosphoric anhydride-urea-melamine-ammonium bicarbonate reaction product.

The nitrogen-containing condensed phosphoric acid compound is particularly preferably one containing 80% or more of a water-insoluble component obtained by sufficiently increasing the degree of polymerization in the calcination step in its production.

The comb-like polymer (C) consisting of a polyethylene main chain and a polyoxyalkylene side chain can be obtained by, for example, graft-copolymerization of a cyclic ether such as ethylene oxide or propylene oxide onto a saponification product of an ethylene-vinyl acetate copolymer; esterification between ethylene-acrylic acid copolymer and polyethylene glycol, poly-propylene glycol or the like; copolymerization of ethylene with ω-hydroxypolyethylene oxide macromonomer; or the like.

The degree of polymerization of ethylene in the polyethylene main chain and the degree of polymerization of oxyalkylene in the polyoxyalkylene side chain are not critical; however, as the comb structure high molecular weight compound, there are particularly preferable in respects of compatibility with the thermoplastic resin, commercial availability and the like compounds obtained by graft-copolymerizing 50–800 parts by weight of ethylene oxide onto 100 parts by weight of a saponification product of an ethylene-vinyl acetate copolymer having a number average molecular weight of 1,000–10,000 and a vinyl acetate content of 5–49% by weight. As its production process, the process disclosed in Japanese Patent Application Kokai No. 3-227,307 is practicable which is a production process comprising heating an ethylene-vinyl acetate copolymer and an alcohol in the presence of an alkali catalyst to saponify them, removing the alcohol and then introducing alkylene oxide thereinto to form a graft copolymer.

In this invention, the following four effects are obtained by using, as one of the essential components, the comb structure high molecular weight compound (C) consisting of a polyethylene main chain and a polyoxyalkylene side chain:

Firstly, the comb-like polymer is excellent in affinity to or compatibility with the nitrogen-containing condensed phosphoric acid compound, and good in dispersibility in various thermoplastic resins which are the base polymer, so that all the constituents are easily finely dispersed by kneading, whereby a homogeneous flame retardant thermoplastic resin composition can be obtained.

Secondly, the comb-like polymer exhibits an oxygen barrier effect and a heat insulating effect because the polyoxyalkylene side chain portion is cured in combustion by the interaction (for example, dehydrating action) with the nitrogen-containing condensed phosphoric acid compound to efficiently form a dense carbonated layer.

Thirdly, the surface resistance of a molded article of the flame resistant thermoplastic resin composition of this invention becomes small owing to the hydrophilic property of the polyoxyalkylene side chain, whereby an antistatic effect can be imparted to the molded article. In particular, the comb-like polymer has a comb-like structure comprising the polyethylene main chain and polyoxyalkylene side chain, and hence, so that unlike straight chain polyoxyalkylenes such as polyethylene glycol and the like and the polyhydroxy low molecular weight compounds such as pentaerythritol and the like disclosed in Japanese Patent Application Kokai No. 60-36,542, the comb-like polymer is characterized by no bleeding to the surface after the molding, a low fugacity, a low elution with water and a long-term antistatic effect.

Fourthly, the comb-like polymer can improve the molding processing characteristics and mold release characteristics in molding of the composition and can prevent the metal mold from being grimed when added to a thermoplastic resin in such an amount that the reduction in mechanical properties and thermal properties of the composition does not cause any practical problem.

The metal-containing compound (D) having a carbonization accelerating effect used in this invention increases the amount of carbonization residue after combustion, thereby enhancing the flame retarding effect though its action mechanism is not clear, and includes various organometallic compounds as mentioned in "Kino Zairyo (Functional Material)", Vol. 11, No. 6 (1991), pp. 34–41 such as ferrocene, dimethylglyoxime copper, acetyl-acetonatocopper, hydroxyquinoline nickel and the like; zinc thiocarbamate compounds such as zinc dimethylthio-carbamate, zinc di-n-butyldithiocarbamate and the like; mercaptobenzothiazole zinc compounds such as mercaptobenzothiazole zinc and the like; salicylaldehyde zinc compounds such as salicylaldehyde zinc and the like; metal hydroxides such as aluminum hydroxide, magnesium hydroxide, calcium magnesium hydroxide, zirconium hydroxide and the like; alkaline earth metal borates such as magnesium borate, calcium magnesium borate and the like; manganese borate; zinc borate; metal oxides such as titanium oxide, tin oxide, nickel oxide, zinc oxide and the like; etc.

Among them, particularly preferable is at least one compound selected from zinc oxide, the zinc thiocarbamate compounds, the mercaptobenzothiazole zinc compounds, the salicylaldehyde zinc compounds, zinc borate and the alkaline earth metal borates.

The proportions of the components constituting the flame retardant thermoplastic resin composition of this invention is such that the proportion of the thermo-plastic resin (A) is 50 to 90% by weight of the composition and the proportion of the total of the nitrogen-containing condensed phosphoric acid compound (B), the comb-like polymer (C) consisting of a polyethylene main chain and a polyoxyalkylene side chain and the metal-containing compound (D) having a carbonization accelerating effect is 50 to 10% by weight of the composition, and the amounts of the components (B), (C) and (D) are 5 to 49% by weight, 1 to 15% by weight compound and 0 to 10% by weight, respectively, in which the total amount of the components (A), (B), (C) and (D) is 100% by weight.

When the proportions of the components (A) to (D) are outside the above-mentioned ranges, it follows that the resulting thermoplastic resin composition is poor in flame retardancy, causes a problem in molding processing characteristics and lacks physical properties such as mechanical strength.

In this invention, the method of mixing the thermoplastic resin (A) which is the base polymer, the nitrogen-containing condensed phosphoric acid compound (B), the comb-like polymer (C) consisting of a polyethylene main chain and a polyoxyalkylene side chain and the metal-containing compound (D) having a carbonization accelerating effect is not critical. For example, all the above components (A) to (D) may be added simultaneously and then mixed together by means of a melt kneading machine such as a Banbury mixer, an open roll, a kneader, a single or multiple screw extruder or the like without or after mixing by a Henschel mixer, a tumbling mixer or the like. Alternatively, the thermoplastic resin (A) which is the base polymer is mixed with a mixture of the nitrogen-containing condensed phosphoric acid compound (B), the comb-like polymer (C) consisting of a polyethylene main chain and a polyoxyalkylene side chain and the metal-containing compound (C) having a carbonization accelerating effect by means of said melt kneading machine without or after mixing by a Henschel mixer, a tumbling mixer or the like.

The flame retardant thermoplastic resin composition of this invention may, if necessary, have added thereto a heat stabilizer, an antioxidant, a light stabilizer, a lubricant, an antifogging agent, a pigment, a blowing agent, a fluorescent agent, a release agent, a processing aid, a reinforcing agent and the like which are generally added to a thermoplastic resin, depending upon the uses of the composition.

Moreover, the flame retardant thermoplastic resin composition of this invention may further have added thereto a nitrogen-containing compound capable of forming a carbonized layer in combustion other than the present nitrogen-containing condensed phosphoric acid compound such as those described in Japanese Patent Application Kokoku No. 60-35,947; Japanese Patent Application Kokai Nos. 1-93,347 and 1-106,643; and the like though said nitrogen-containing compound is not essential to this invention.

Furthermore, the flame retardant thermoplastic resin composition may, if necessary, have added thereto a known flame-retardant such as a halogen-containing flame-retardant, an inorganic flame-retardant or the like.

This invention provides a flame-retardant which can be applied to the thermoplastic resin (A), said flame-retardant comprising, as the effective components, (B) 10 to 98% by weight of a nitrogen-containing condensed phosphoric acid compound, (C) 2 to 30% by weight of a comb-like polymer consisting of a polyethylene main chain and a polyoxyalkylene side chain and (D) 0 to 20% by weight of a metal-containing compound having a carbonization accelerating effect.

The above components (B), (C) and (D) include those specifically mentioned above, respectively.

When the proportions of the components (B) to (D) are outside the above-mentioned ranges, the performance as flame-retardant becomes poor, a problem is caused in molding processing characteristics, and the physical properties including mechanical strength and the like of a thermoplastic resin into which the flame-retardant has been incorporated become insufficient, and hence, the commercial value of the resulting thermoplastic resin composition becomes very low.

The flame-retardant of this invention may be prepared by any mixing method. For example, the nitrogen-containing condensed phosphoric acid compound (B), the comb-like polymer (C) consisting of a polyethylene main chain and a polyoxyalkylene side chain and the metal-containing compound (D) having a carbonization accelerating effect may be added simultaneously and then mixed by means of a Henschel mixer or the like.

The flame-retardant of this invention may have added thereto a heat stabilizer, an antioxidant, a light stabilizer, a release agent, a processing aid and the like depending upon the uses of the flame-retardant. The flame-retardant of this invention may further have added thereto a nitrogen-containing compound capable of forming a carbonized layer in combustion as described in Japanese Patent Application Kokoku No. 60-35,947 and Japanese Patent Application Kokai Nos. 1-93,347 and 1-106,643 but other than the present nitrogen-containing condensed phosphoric acid compound though the nitrogen-containing compound is not essential to this invention.

As explained in detail above, the flame-retardant of this invention can provide an excellent flame retardancy to a thermoplastic resin composition, and the flame retardant thermoplastic resin composition of this invention has not only excellent flame retardancy but also good resin properties, excellent molding processing characteristics and long term antistatic properties, and can be applied to a wide use including film, sheet, molded articles and the like.

DESCRIPTION OF THE PREFERRED EMBODIMENTS

This invention is explained specifically below referring to Examples; however, this invention is not limited thereto.

Incidentally, the following Reference Example shows methods for producing the comb-like polymer consisting of a polyethylene main chain and a polyoxyalkylene side chain and nitrogen-containing condensed phosphoric acid compounds used in the Examples (the comb-like polymer is referred to hereinafter as CPO and the nitrogen-containing condensed phosphoric acid compound is referred to hereinafter as PN) and the constituents of the CPO and the PN.

REFERENCE EXAMPLE (1) Method for producing CPO-A

In a 700-liter autoclave were placed 160 kg of an ethylene-vinyl acetate copolymer having an ethylene content of 31% by weight and a number average molecular weight of 1,900, 400 ml of methanol and 3.2 kg of sodium hydroxide, and they were subjected to reaction at 64° C. for two hours, and subsequently the temperature of the reaction mixture was elevated to 150° C. to remove the methanol by distillation, thereby obtaining 136 kg of a reaction product having a saponification percentage of 97%.

Subsequently, 272 kg of ethylene oxide was incorporated into the said reaction product in the said autoclave with stirring at a temperature of 150° C. over two hours to obtain 406 kg of a graft compound (referred to hereinafter as CPO-A).

(2) Method for producing CPO-B

In a 5-liter autoclave was placed 0.5 kg of the reaction product having a saponification percentage of 97% obtained in the same manner as in (1) above, and 2.5 kg of ethylene oxide was introduced thereinto with stirring at a temperature of 150° C. over two hours. After the reaction, 2.95 kg of a graft compound (referred to hereinafter as CPO-B) was recovered.

(3) PN-A component

Ammonium polyphosphate (Sumisafe P, a registered trademark of Sumitomo Chemical Co., Ltd.; catalog value: phosphorus content of 31–32% by weight and nitrogen content of 14–16% by weight) was used.

(4) PN-B component

Melamine-modified ammonium polyphosphate (Sumisafe PM, a registered trademark of Sumitomo Chemical Co., Ltd., catalog values: phosphorus content of 20–21% by weight and nitrogen content of 32–35% by weight) was used.

(5) Method for producing PN-C

In a 2-liter stainless steel beaker were placed 160 g of urea, 60 g of ammonium bicarbonate and 40 g of melamine, and they were mixed therein, after which 180 g of phosphoric anhydride was added thereto with stirring.

The resulting mixture was heated to 80° C., upon which the temperature of the mixture was further elevated by generation of heat due to reaction to reach about 220° C. The mixture was calcined at 240°–260° C. for 30 minutes while the stirring was further continued.

The reaction product was a rough powder containing a small bulk-like or particulate material. This was cooled and thereafter mechanically ground to obtain 341 g of a nitrogen-containing condensed phosphoric acid compound (phosphoric anhydride-urea-melamine-ammonium bicarbonate reaction product) which passed completely through a 200-mesh screen.

This powder had a phosphorus content of 20.9% by weight and a nitrogen content of 26.5% by weight.

EXAMPLE 1

12.5 parts by weight of PN-A, 12.5 parts by weight of PN-B, 3 parts by weight of CPO-A and 2 parts by weight of zinc oxide were mixed, and the resulting mixture and 70 parts by weight of polypropylene (Sumitomo Noblen AH561, a registered trademark of Sumitomo Chemical Co., Ltd.) (referred to hereinafter as PP) were placed at one time in a Henschel mixer and mixed therein.

Subsequently, the resulting mixture was fed to a single screw extruder (VS 40-mm extruder manufactured by Tanabe Plastic Machine) and melt-kneaded at a die temperature of 220° C. and the resulting strands were subjected to water-cooled cutting and drying, to obtain thermoplastic resin composition pellets.

The pellets were injected into a test piece mold for measuring various physical properties at 60° C. by an injection machine (Model IS100EN manufactured by Toshiba Machine) at a die temperature of 230° C. to prepare a molding test piece. This molding test piece was stored at 23° C. at a humidity of 50% for a whole day and night and then subjected to measurement of physical properties by the following methods:

(i) Melt flow rate

Measured according to ASTM D1238 at 230° C. under a load of 2.16 kg.

(ii) Tensile test

Measured according to ASTM D638 by drawing a No. 1 test piece at a rate of 10 mm/min.

(iii) Flexural modulus

Measured according to ASTM D790 in a test piece thickness of ¼ inch.

(iv) Impact strength

Measured according to ASTM D256 using a notched test piece having a thickness of ⅛ inch.

(v) Deflection temperature under load

Measured according to ASTM D638 in a test piece thickness of ¼ inch under a load of 4.6 kg/cm$^2$.

(vi) Surface resistivity

Using an ultra megohm meter Model SM-10E (manufactured by TOA Electronics Ltd.), a sheet having a test piece thickness of 6.3 mm was measured at 23° C. at a humidity of 50%.

(vii) Flame retardancy

① Burning test

Measured according to the vertical flame test method defined in UL-94 in a test piece thickness of ⅛ inch or 1/16 inch.

② Oxygen index

Measured according to JIS K7201 using a test piece having a width of 6.0 mm and a thickness of 3.2 mm.

The above-mentioned mixing conditions and the results of the measurement of physical properties obtained are shown in Table 1.

Example 2

The same procedure as in Example 1 was repeated, except that the zinc oxide was not used and 13.5 parts by weight of PN-A and 13.5 parts by weight of PN-B were used.

The mixing conditions and results of measurement of physical properties obtained are shown in Table 1.

Comparative Examples 1 to 3

The same procedure as in Example 1 was repeated, except that PP, PN-A, PN-B and zinc oxide were used in the amounts shown in Table 1.

The mixing conditions and results of measurement of physical properties obtained are shown in Table 1.

Examples 3 to 5

The same procedure as in Example 1 was repeated, except that the components shown in Table 2 were used in the amounts shown in Table 2.

The mixing conditions and results of measurement of physical properties obtained are shown in Table 2.

Examples 6 to 12 and Comparative Examples 4 and 5

The same procedure as in Example 1 was repeated, except that the components shown in Table 3 were used in the amounts shown in Table 3.

The mixing conditions and results of measurement of physical properties obtained are shown in Table 3.

Examples 13 to 16

The same procedure as in Example 1 was repeated, except that the zinc oxide was replaced by the compounds shown in Table 4.

The burning test results obtained are shown in Table 4.

TABLE 1

|  | Unit | Example 1 | Example 2 | Comp. Ex. 1 | Comp. Ex. 2 | Comp. Ex. 3 |
|---|---|---|---|---|---|---|
| Composition |  |  |  |  |  |  |
| PP | wt. % | 70 | 70 | 100 | 70 | 70 |
| PN-A | wt. % | 12.5 | 13.5 | — | 15 | 14 |
| PN-B | wt. % | 12.5 | 13.5 | — | 15 | 14 |
| CPO-A | wt. % | 3 | 3 | — | — | — |
| Zinc Oxide | wt. % | 2 | — | — | — | 2 |
| Melt flow rate | g/10 min | 2.8 | 5.0 | 4.7 | 1.9 | 1.9 |
| Tensile yield stress | kg/cm$^2$ | 200 | 190 | 250 | 210 | 210 |
| Tensile stress at break | kg/cm$^2$ | 200 | 210 | — | 170 | 180 |
| Tensile elongation at break | % | 530 | 740 | not less than 800 | 200 | 240 |
| Flexural modulus | kg/cm$^2$ | 15300 | 11700 | 12000 | 16100 | 19400 |
| Flexural strength | kg/cm$^2$ | 280 | 260 | 320 | 320 | 340 |
| Impact strength (−20° C.) | kg·cm/cm | 2.2 | 2.2 | 4.3 | 2.1 | 2.2 |
| (0° C.) | kg·cm/cm | 3.2 | 3.6 | 7.5 | 2.0 | 2.1 |
| (23° C.) | kg·cm/cm | 7.4 | 8.4 | 57 | 4.1 | 3.9 |
| Deflection temp. under load | °C. | 64 | 56 | 64 | 67 | 72 |
| Surface resistivity | Ω/□ | $10^{13}$ | $10^{12}$ | $10^{17}$ | $10^{17}$ | $10^{15}$ |
| Burning test (1/16 inch) |  | V-0 | V-2 | Failure | Failure | Failure |
| (⅛ inch) |  | V-0 | V-1 | Failure | Failure | Failure |
| Oxygen index |  | 28.7 | 28.3 | — | 24.2 | 22.8 |

TABLE 2

|  | Unit | Example 3 | Example 4 | Example 5 |
|---|---|---|---|---|
| Composition |  |  |  |  |
| PP | wt. % | 70 | 70 | 70 |
| PN-A | wt. % | 12.5 | 12.5 | 12.5 |
| PN-B | wt. % | 12.5 | 12.5 | 12.5 |
| CPO-A | wt. % | 5 | 3 | — |
| CPO-B | wt. % | — | — | 3 |

TABLE 2-continued

|  | Unit | Example 3 | Example 4 | Example 5 |
|---|---|---|---|---|
| Calcium magnesium borate | wt. % | — | 2 | 2 |
| Melt flow rate | g/10 min | 8.0 | 3.8 | 3.6 |
| Tensile yield stress | kg/cm$^2$ | 190 | 200 | 200 |
| Tensile stress at break | kg/cm$^2$ | 220 | 220 | 200 |
| Tensile elongation at break | % | 690 | 620 | 580 |
| Flexural modulus | kg/cm$^2$ | 11400 | 13800 | 15300 |
| Flexural strength | kg/cm$^2$ | 250 | 280 | 300 |
| Impact strength (−20° C.) | kg · cm/cm | 2.1 | 2.2 | 2.2 |
| (0° C.) | kg · cm/cm | 3.3 | 3.2 | 2.9 |
| (23° C.) | kg · cm/cm | 8.9 | 7.0 | 7.8 |
| Deflection temp. under load | °C. | 57 | 60 | 57 |
| Surface resistivity | Ω/□ | $10^{12}$ | $10^{13}$ | $10^{12}$ |
| Burning test (⅛ inch) |  | V-2 | V-0 | V-1 |
| Oxygen index |  | 27.5 | 27.7 | 27.7 |

TABLE 3

|  | PP (wt. %) | PN-C (wt. %) | CPO-B (wt. %) | Zinc oxide (wt. %) | Calcium magnesium borate (wt. %) | Burning test (⅛ inch) | Oxygen index |
|---|---|---|---|---|---|---|---|
| Example 6 | 70 | 22.5 | 7.5 | — | — | V-2 | 26.0 |
| Example 7 | 70 | 22.5 | 5.0 | 2.5 | — | V-2 | 27.0 |
| Example 8 | 70 | 22.5 | 2.5 | 5.0 | — | V-1 | 27.5 |
| Example 9 | 70 | 22.5 | 5.0 | — | 2.5 | V-2 | 27.0 |
| Example 10 | 70 | 27 | 3 | — | — | V-0 | 29.0 |
| Example 11 | 70 | 25 | 3 | 2 | — | V-0 | 28.5 |
| Example 12 | 70 | 25 | 3 | — | 2 | V-0 | 28.5 |
| Comp. Ex. 4 | 70 | 30 | — | — | — | Failure | 23.2 |
| Comp. Ex. 5 | 70 | 25 | — | 5 | — | Failure | 22.0 |

TABLE 4

|  | Metal-containing compound having carbonization accelerating effect | Burning test (⅛ inch) | Oxygen index |
|---|---|---|---|
| Example 13 | Zinc dimethylcarbamate | V-1 | 27.0 |
| Example 14 | Zinc borate | V-0 | 27.5 |
| Example 15 | Mercaptobenzothiazole zinc | V-0 | 27.1 |
| Example 16 | Salicylaldehyde zinc | V-0 | 27.3 |

What is claimed is:

1. A flame retardant thermoplastic resin composition which comprises (A) a thermoplastic resin which is the base polymer, (B) a nitrogen-containing condensed phosphoric acid compound, (C) a comb-like polymer consisting of a polyethylene main chain and a polyoxyalkylene side chain and (D) a metal-containing compound having a carbonization accelerating effect, the amount of the component (A) being 50 to 90% by weight of the composition and the amounts of the components (B), (C) and (D) being 5 to 49% by weight, 1 to 15% by weight and 0 to 10% by weight, respectively, in which the total amount of the components (A), (B), (C) and (D) is 100% by weight.

2. The flame retardant thermoplastic resin composition according to claim 1, wherein the thermoplastic resin (A) is a thermoplastic resin consisting of at least one olefin polymer.

3. The flame retardant thermoplastic resin composition according to claim 1, wherein the thermoplastic resin (A) is a thermoplastic resin consisting of at least one vinyl aromatic polymer.

4. The flame retardant thermoplastic resin composition according to claim 1, wherein the nitrogen-containing condensed phosphoric acid compound (B) is at least one compound selected from the group consisting of ammonium polyphosphate, polyphosphoric acid amide, melamine-modified ammonium polyphosphate, carbamyl polyphosphate and phosphoric anhydride-urea-melamine-ammonium bicarbonate reaction product.

5. The flame retardant thermoplastic resin composition according to claim 1, wherein the comb-like polymer (C) consisting of a polyethylene main chain and a polyoxyalkylene side chain is a compound obtained by graft-copolymerizing 50 to 800 parts by weight of ethylene oxide onto 100 parts by weight of a saponification product of an ethylene-vinyl acetate copolymer having a number average molecular weight of 1,000 to 10,000 and a vinyl acetate content of 5 to 49% by weight.

6. The flame retardant thermoplastic resin composition according to claim 1, wherein the metal-containing compound (D) having a carbonization accelerating effect is at least one compound selected from the group consisting of zinc oxide, zinc thiocarbamate compounds, mercaptobenzothiazole zinc compounds, salicylaldehyde zinc compounds, zinc borate and alkaline earth metal borates.

7. A flame-retardant which comprises (B) 10 to 98% by weight of a nitrogen-containing condensed phosphoric acid compound, (C) 2 to 30% by weight of a comb-like polymer consisting of a polyethylene main chain and a polyoxyalkylene side chain and (D) 0 to 20% by weight of a metal-containing compound having a carbonization accelerating effect.

8. The flame-retardant according to claim 7, wherein the nitrogen-containing condensed phosphoric acid compound (B) is at least one compound selected from the group consisting of ammonium polyphosphate, polyphosphoric acid amide, melamine-modified ammonium polyphosphate, carbamyl polyphosphate and phosphoric anhydride-urea-melamine-ammonium bicarbonate reaction product.

9. The flame-retardant according to claim 7, wherein the comb-like polymer (C) consisting of a polyethylene main chain and a polyoxyalkylene side chain is a compound obtained by graft-copolymerizing 50 to 800 parts by weight of ethylene oxide onto 100 parts by weight of a saponification product of an ethylene-vinyl acetate copolymer having a number average molecular weight of 1,000 to 10,000 and a vinyl acetate content of 5 to 49% by weight.

10. The flame-retardant according to claim 7, wherein the metal-containing compound (D) having a carbonization accelerating effect is at least one compound selected from the group consisting of zinc oxide, zinc thiocarbamate compounds, mercapto-benzothiazole zinc compounds, salicylaldehyde zinc compounds, zinc borate and alkaline earth metal borates.

11. A process for producing a flame retardant thermoplastic resin composition, which comprises mixing (A) 50 to 90% by weight of a thermoplastic resin which is the base polymer, (B) a nitrogen-containing condensed phosphoric acid compound, (C) a comb-like polymer consisting of a polyethylene main chain and a polyoxyalkylene side chain and (D) a metal-containing compound having a carbonization accelerating effect, the amounts of the components (B), (C) and (D) being 5 to 49% by weight, 1 to 15% by weight and 0 to 10% by weight, respectively, in which the total amount of the components (A), (B), (C) and (D) is 100% by weight.

12. The process according to claim 11, wherein the thermoplastic resin (A) is a thermoplastic resin consisting of at least one olefin polymer.

13. The process according to claim 11, wherein the thermoplastic resin (A) is a thermoplastic resin consisting of at least one vinyl aromatic polymer.

14. The process according to claim 11, wherein the nitrogen-containing condensed phosphoric acid compound (B) is at least one compound selected from the group consisting of ammonium polyphosphate, polyphosphoric acid amide, melamine-modified ammonium polyphosphate, carbamyl polyphosphate and phosphoric anhydride-urea-melamine-ammonium bicarbonate reaction product.

15. The process according to claim 11, wherein the comb-like polymer (C) consisting of a polyethylene main chain and a polyoxyalkylene side chain is a compound obtained by graft-copolymerizing 50 to 800 parts by weight of ethylene oxide onto 100 parts by weight of a saponification product of an ethylene-vinyl acetate copolymer having a number average molecular weight of 1,000 to 10,000 and a vinyl acetate content of 5 to 49% by weight.

16. The process according to claim 11, wherein the metal-containing compound (D) having a carbonization accelerating effect is at least one compound selected from the group consisting of zinc oxide, zinc thiocarbamate compounds, mercaptobenzothiazole zinc compounds, salicylaldehyde zinc compounds, zinc borate and alkaline earth metal borates.

17. A process for producing a flame-retardant which comprises mixing (B) 10 to 98% by weight of a nitrogen-containing condensed phosphoric acid compound, (C) 2 to 30% by weight of a comb-like polymer consisting of a polyethylene main chain and a polyoxyalkylene side chain and (D) 0 to 20% by weight of a metal-containing compound having a carbonization accelerating effect as the effective components.

18. The process according to claim 17, wherein the nitrogen-containing condensed phosphoric acid compound (B) is at least one compound selected from the group consisting of ammonium polyphosphate, polyphosphoric acid amide, melamine-modified ammonium polyphosphate, carbamyl polyphosphate and phosphoric anhydride-urea-melamine-ammonium bicarbonate reaction product.

19. The process according to claim 17, wherein the comb-like polymer (C) consisting of a polyethylene main chain and a polyoxyalkylene side chain is a compound obtained by graft-copolymerizing 50 to 800 parts by weight of ethylene oxide onto 100 parts by weight of a saponification product of an ethylene-vinyl acetate copolymer having a number average molecular weight of 1,000 to 10,000 and a vinyl acetate content of 5 to 49% by weight.

20. The process according to claim 17, wherein the metal-containing compound (D) having a carbonization accelerating effect is at least one compound selected from the group consisting of zinc oxide, zinc thio-carbamate compounds, mercaptobenzothiazole zinc compounds, salicylaldehyde zinc compounds, zinc borate and alkaline earth metal borates.

* * * * *